(12) United States Patent
Park

(10) Patent No.: US 11,474,374 B1
(45) Date of Patent: Oct. 18, 2022

(54) FOLDABLE EYEGLASS BRIDGE

(71) Applicant: Min Gyu Park, Busan (KR)

(72) Inventor: Min Gyu Park, Busan (KR)

( * ) Notice: Subject to any disclaimer, the term of this patent is extended or adjusted under 35 U.S.C. 154(b) by 0 days.

(21) Appl. No.: 17/670,726

(22) Filed: Feb. 14, 2022

(51) Int. Cl.
*G02C 5/08* (2006.01)
(52) U.S. Cl.
CPC ..................... *G02C 5/08* (2013.01)
(58) Field of Classification Search
CPC . G02C 5/00; G02C 5/006; G02C 5/08; G02C 7/08; G02C 7/10; G02C 9/04; G02C 2200/12; G02C 2200/22
See application file for complete search history.

(56) References Cited

U.S. PATENT DOCUMENTS

| 9,405,128 | B2* | 8/2016 | Kim | G02C 5/08 |
| 9,671,623 | B2* | 6/2017 | Chute | G02C 5/08 |
| 10,203,517 | B2* | 2/2019 | Greenberg | G02C 5/006 |

* cited by examiner

*Primary Examiner* — Mustak Choudhury
(74) *Attorney, Agent, or Firm* — IPLA P.A.

(57) ABSTRACT

An eyeglass bridge structure includes: lateral portions each extending from rims, a square opening and an elongate opening formed in the lateral portions; connectors each having a circular hook, an inner surface, a mid surface, a hook start, an outer protrusion start, a recessed surface, the circular hook extending from the hook start, a square protrusion extending from the outer protrusion start, a support extending from the square protrusion, a straight surface formed parallel opposed to the inner surface, the mid surface and the recessed surface, an end wall provided to link the inner surface and the straight surface, a stopper formed extending from an outer surface of the circular hook; and a rectangular central piece having a mid portion and distal portions extending outwardly from the mid portion, a hook opening formed in the distal portions.

12 Claims, 4 Drawing Sheets

FOLDABLE EYEGLASS BRIDGE

BACKGROUND

This invention relates to a foldable eyeglass bridge, more particularly, to an improved foldable eyeglass bridge structure, which enhances usability of sunglasses, prescription glasses and reading glasses by enabling angular and elastic folding and unfolding motions.

Conventional foldable eyeglasses tend to focus on space-saving and foldable functions for those who wear sunglasses, reading glasses and other types of spectacles. When folded, the foldable glasses remain as small flat as possible. Foldable glasses provide convenience to keep with you in a wallet if you are not using ones. A disadvantage of the conventional foldable eyewear is deficiency of combination function, fashion, and style, thus hard to meet ever changing market demand.

SUMMARY OF THE INVENTION

The present invention is contrived to overcome the conventional disadvantages. Accordingly, an objective of the present invention is to provide an eyeglass bridge structure with foldable function to improve product reliability by adopting an angular folding characteristic.

Another objective of an improved eyeglass bridge structure is to introduce elasticity in folding and unfolding motions without requiring elastic parts.

A still another objective is to provide a foldable eyewear bridge structure improving usability and product safety by minimizing required parts for the motion of folding and unfolding.

In order to achieve these and other objectives, an eyeglass bridge structure according to the present invention comprises first and second lateral portions each extending from first and second rims, wherein a substantially square opening and an elongate opening are formed in an inward progression in the first and second lateral portions, wherein a contact surface is defined between the square opening and the elongate opening, wherein the elongate opening is defined by an inner wall, an outer wall and side walls.

The eyeglass bridge structure further comprises first and second connectors each having a circular hook, an inner surface, a mid surface, a hook start between the inner and mid surfaces, an outer protrusion start, a recessed surface between the mid surface and the outer surface, wherein the circular hook extends from the hook start, wherein a substantially square protrusion extends from the outer protrusion start, wherein a support extends upward and outward in angle from the substantially square protrusion to form a right angle between the protrusion and the support, wherein a straight surface is formed parallel opposed to the inner surface, the mid surface and the recessed surface, wherein a thickness between the inner surface and the straight surface is larger than another thickness between the recessed surface and the straight surface, wherein an end wall is provided to link the inner surface and the straight surface, wherein a stopper is formed extending from an outer surface of the circular hook.

Still further provided is a substantially rectangular central piece having a mid portion and a first and second distal portions extending outwardly from the mid portion, wherein a hook opening formed in the first and second distal portions.

The connectors are operably assembled to the lateral portions and the central piece such that the protrusion stays in the square opening and the support stays in touch with a support surface defined between the square opening and the corresponding rim with the recessed surface receiving the contact surface, wherein the circular hook holds the central piece towards the lateral portions such that the circular hook remains substantially pushed in the hook opening, whereby the connectors with the lateral portions engaged thereto are folded inward so as for the circular hook to push in through the elongate opening till the stopper gets in touch with the mid portion to form a right angle between the central piece and the mid surface.

The mid portion of the central piece may be formed in an outward arc format. The thickness between the inner surface and the straight surface may be one fifth larger than the other thickness between the recessed surface and the straight surface. The lateral portions, the connectors and the central piece may be made of an identical material selected from monel, titanium and beryllium.

In a preferred version, an upper end of the end wall of each of the first and second connectors serves to elastically slide on a lower end of each of the inner wall of the first and second lateral portions when the bridge structure is unfolded, and elastically release from the lower end of the inner wall of each of the first and second lateral portions when the bridge structure is folded.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
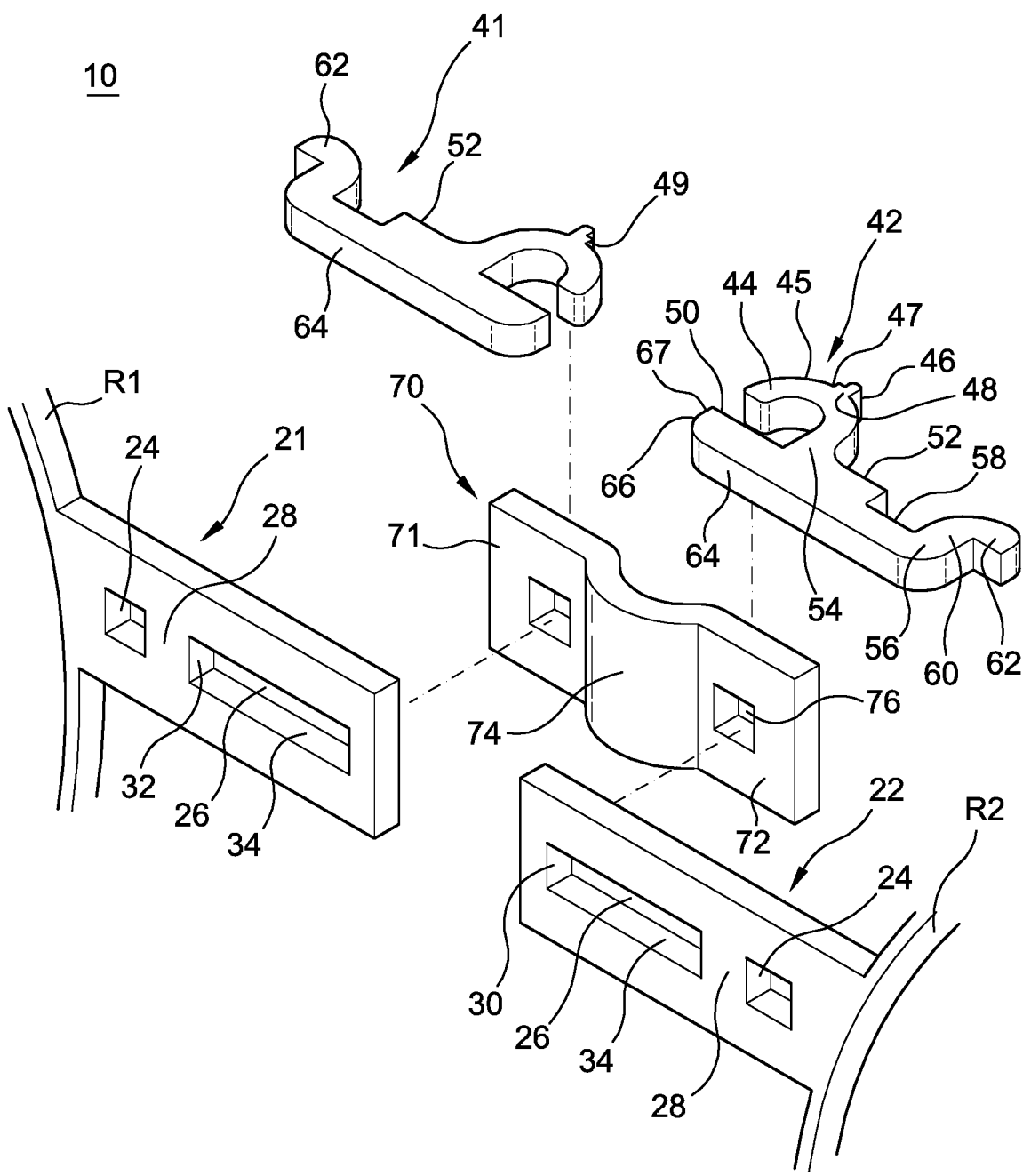
FIG. 1 is an exploded perspective view showing an eyeglass bridge structure according to the present invention.
Figure 2:
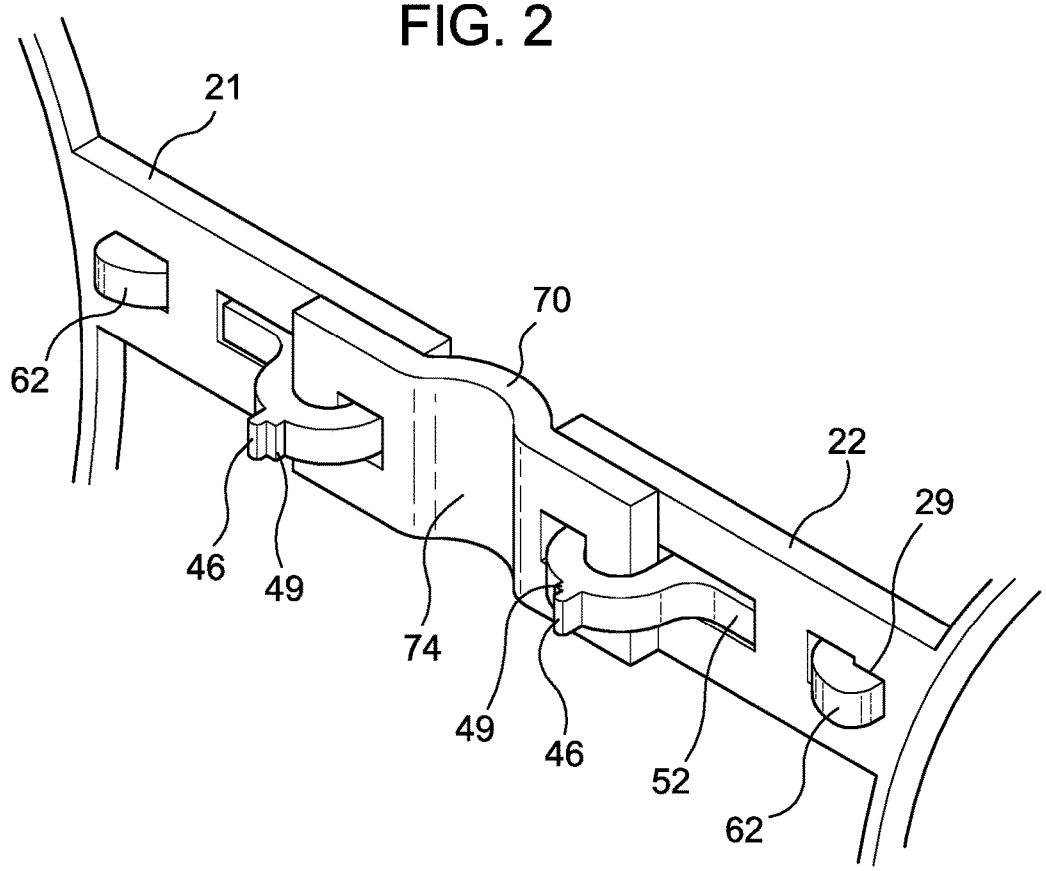
FIG. 2 is another perspective view showing the eyeglass bridge structure according to the present invention.
Figure 3:
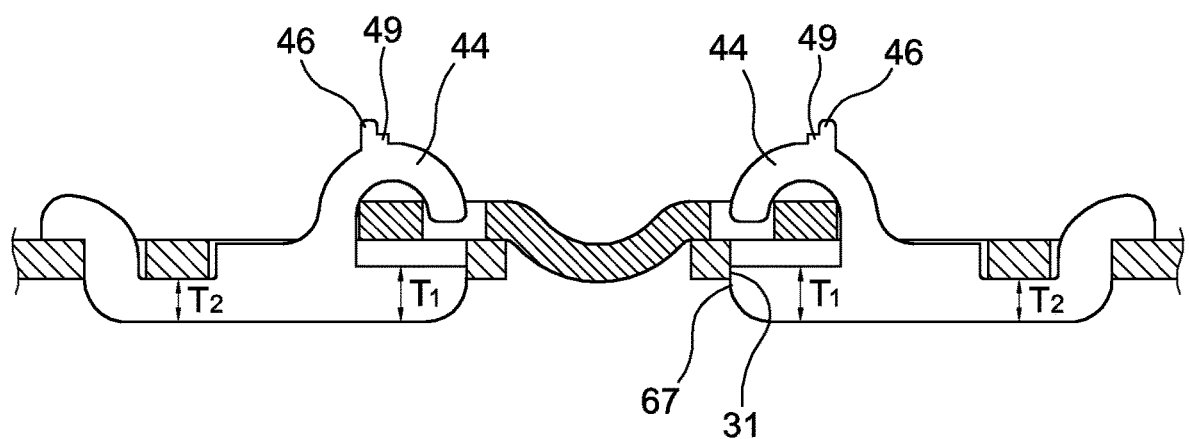
FIG. 3 is a cross section of the eyeglass bridge structure according to the present invention.
Figure 4:
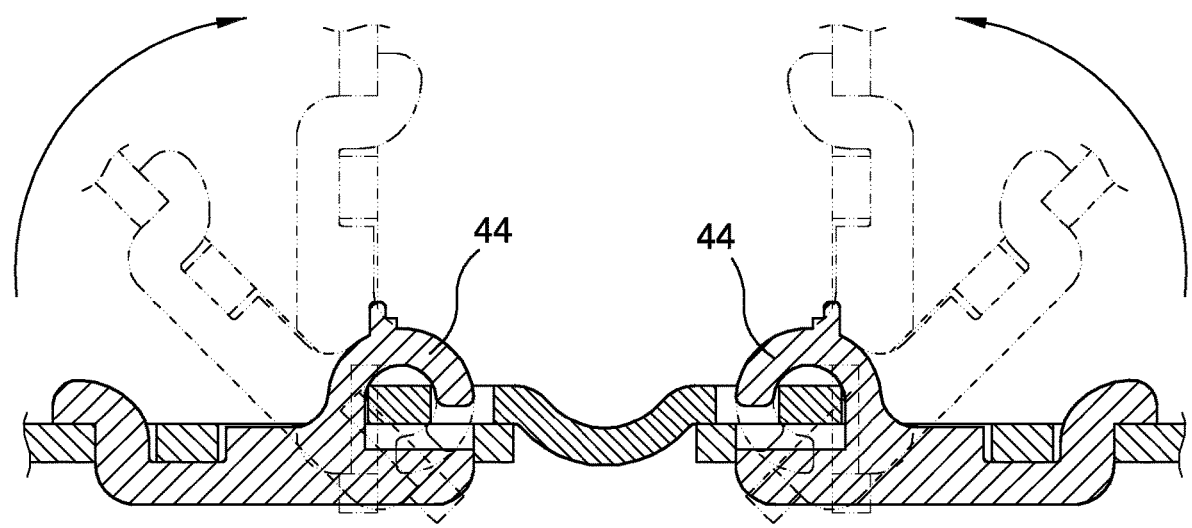
FIG. 4 is a schematic view showing the folding mechanism of the eyeglass bridge structure according to the present invention.
Figure 5:
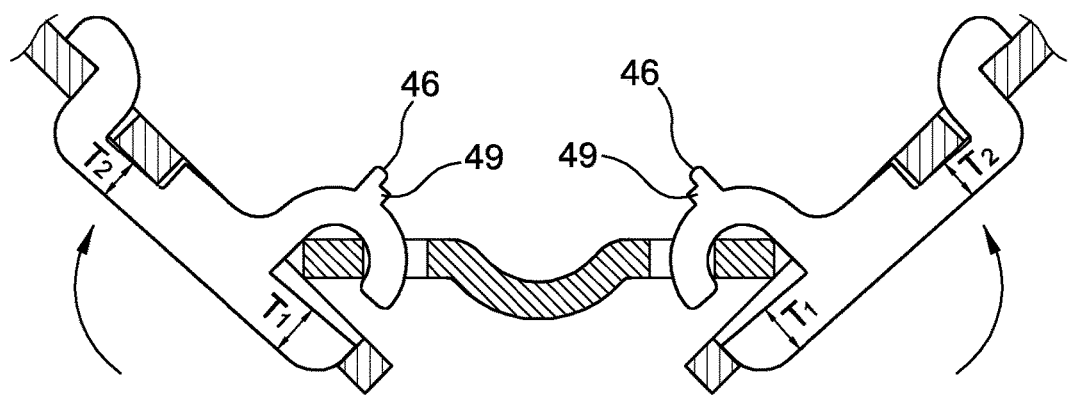
FIG. 5 is another schematic view showing the folding mechanism of the eyeglass bridge structure according to the present invention.
Figure 6:
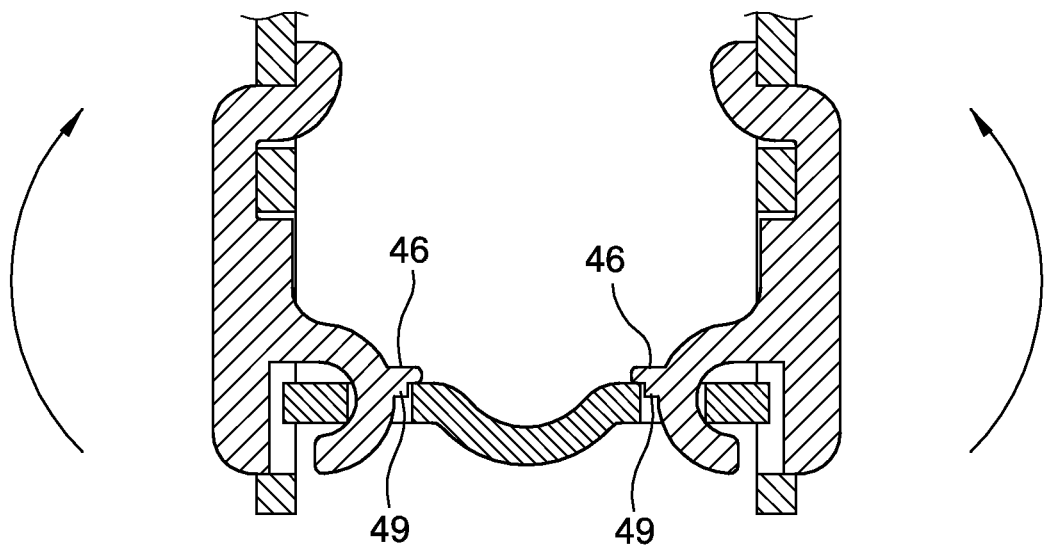
FIG. 6 is a cross section of the eyeglass bridge structure according to the present invention to show a folded bridge structure.
Figure 7:
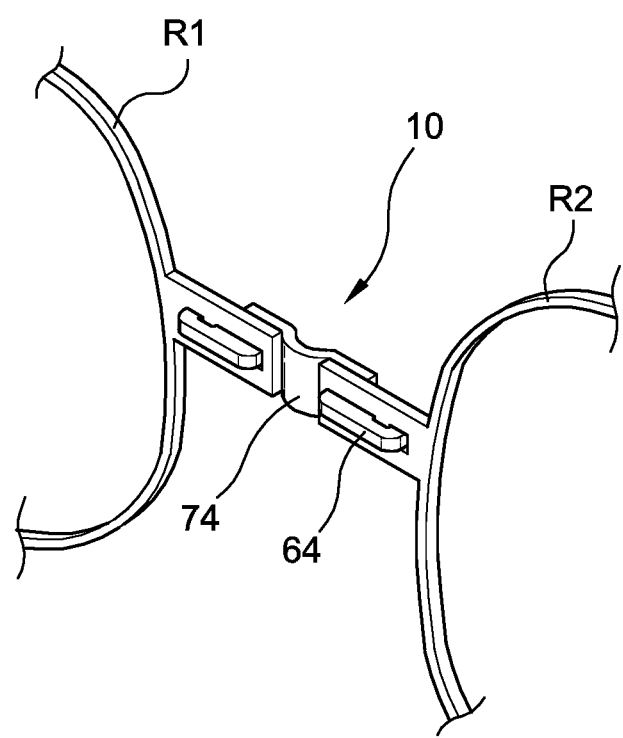
FIG. 7 is a perspective view showing the eyeglass bridge structure according to the present invention, applied to eyeglasses.

With reference to the accompanying drawings, an eyeglass bridge structure will now be explained. The eyeglass bridge structure 10 comprises first and second lateral portions 21 and 22 each extending from first and second rims R1 and R2. The lateral portions 21 and 22 are each preferably formed straight in a substantial rectangular plate form. A substantially square opening 24 and an elongate opening 26 are formed in an inward progression in the first and second lateral portions. The square opening 24 is formed adjacent to the corresponding rim and the elongate opening 26 is formed next to the square opening 24 and away from the corresponding rim. A contact surface 28 is secured and defined between the square opening 24 and the elongate opening 26. The elongate opening 26 is defined by an inner wall 30, an outer wall 32 and side walls 34.

The eyeglass bridge structure 10 further comprises first and second connectors 41 and 42 each having a circular hook 44, an inner surface 50, a mid surface 52, a hook start 54 between the inner and mid surfaces, an outer protrusion start 56, a recessed surface 58 between the mid surface 52 and the outer protrusion start 56. The circular hook 44 extends from the hook start 54. A substantially square protrusion 60 extends from the outer protrusion start 56. In this construction, a support 62 extends upward and outward in angle from the substantially square protrusion 60 to form a right angle between the square protrusion 60 and the support 62. A straight surface 64 is formed in parallel with and opposed to each of the inner surface 50, the mid surface 52 and the recessed surface 58.

In a preferred version, a thickness T1 between the inner surface 50 and the straight surface 64 is larger than another thickness T2 between the recessed surface 58 and the straight surface 64. An end wall 66 is provided to link the inner surface 50 and the straight surface 64. A stopper 46 is formed extending from an outer surface 45 of the circular hook 44. Preferably, the stopper 46 extends from a substantial center 47 of the circular hook 44. The stopper 46 may extend from a substantially decentered spot 48 of the circular hook 44. The stopper 46 comprises a cushion step 49 formed extending towards the central piece 70 from the stopper 46 and the circular hook 44. In this construction, the cushion step 49 is formed shorter and lower than the stopper 44 to fully fit in the hook opening 76 of the central piece 70 when the eyeglass bridge structure 10 is folded.

For a better performance, the eyeglass bridge structure 10 further comprises a substantially rectangular central piece 70 having a mid portion 74 and a first and second distal portions 71 and 72 extending outwardly from the mid portion 74. A hook opening 76 is formed in each of the first and second distal portions 71 and 72.

In the eyeglass bridge structure as discussed above, the connectors 41 and 42 are operably assembled to the lateral portions 21 and 22 and to the central piece 70 such that the square protrusion 60 stays in the square opening 24 and the support 62 stays in touch with a support surface 29 defined between the square opening 24 and the corresponding rim with the recessed surface 58 receiving the contact surface 28. The circular hook 44 holds the central piece 70 towards the corresponding lateral portion 21 or 22 such that the circular hook 44 remains substantially pushed in the hook opening 76 of the central piece 70, whereby the connectors 41 and 42 with the lateral portions 21 and 22 engaged thereto are folded inward so as for the circular hook 44 to push in through the elongate opening 26 till the stopper 46 gets in touch with the mid portion 74 to form a right angle between the central piece 70 and the mid surface 52. The mid portion 74 of the central piece 70 may be formed in an arc format, preferably, in an outward arc format. The lateral portions 21 and 22, the connectors 41 and 42, and the central piece 70 are preferably made of an identical material selected from monel, titanium and beryllium.

The thickness T1 between the inner surface 50 and the straight surface 64 is preferably one fifth larger than the other thickness T2 between the recessed surface 58 and the straight surface 64. In this construction, an upper end 67 of the end wall 66 of each of the first and second connectors 41 and 42 serves to elastically slide on a lower end 31 of the inner wall 30 of each of the first and second lateral portions 21 and 22 when the bridge structure 10 is unfolded, and elastically release from the lower end 31 of the inner wall 30 of each of the first and second lateral portions 21 and 22 when the bridge structure 10 is folded.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An eyeglass bridge structure, comprising:

first and second lateral portions each extending from first and second rims, wherein a substantially square opening and an elongate opening are formed in an inward progression in the first and second lateral portions, wherein a contact surface is defined between the square opening and the elongate opening, wherein the elongate opening is defined by an inner wall, an outer wall and side walls;

first and second connectors each having a circular hook, an inner surface, a mid surface, a hook start between the inner and mid surfaces, an outer protrusion start, a recessed surface between the mid surface and the outer protrusion start, wherein the circular hook extends from the hook start, wherein a substantially square protrusion extends from the outer protrusion start, wherein a support extends upward and outward in angle from the substantially square protrusion to form a right angle between the protrusion and the support, wherein a straight surface is formed parallel opposed to the inner surface, the mid surface and the recessed surface, wherein a thickness between the inner surface and the straight surface is larger than another thickness between the recessed surface and the straight surface, wherein an end wall is provided to link the inner surface and the straight surface, wherein a stopper is formed extending from an outer surface of the circular hook; and a substantially rectangular central piece having a mid portion and first and second distal portions extending outwardly from the mid portion, wherein a hook opening is formed in the first and second distal portions;

wherein the connectors are operably assembled to the lateral portions and the central piece such that the protrusion stays in the square opening and the support stays in touch with a support surface defined between the square opening and the corresponding rim with the recessed surface receiving the contact surface, wherein the circular hook holds the central piece towards the corresponding lateral portion such that the circular hook remains substantially pushed in the hook opening, whereby the connectors with the lateral portions engaged thereto are folded inward so as for the circular hook to push in through the elongate opening till the stopper gets in touch with the mid portion to form a right angle between the central piece and the mid surface.

2. The eyeglass bridge structure of claim 1, wherein the mid portion of the central piece are formed in an arc format.

3. The eyeglass bridge structure of claim 1, wherein the mid portion of the central piece are formed in an outward arc format.

4. The eyeglass bridge structure of claim 1, wherein the thickness between the inner surface and the straight surface is one fifth larger than the other thickness between the recessed surface and the straight surface.

5. The eyeglass bridge structure of claim 1, wherein the lateral portions, the connectors and the central piece are made of an identical material selected from monel, titanium and beryllium.

6. The eyeglass bridge structure of claim 1, wherein the stopper comprises a cushion step formed extending towards the central piece from the stopper and the circular hook, wherein the cushion step is formed shorter and lower than the stopper to fully fit in the hook opening of the central piece when the eyeglass bridge structure is folded.

7. An eyeglass bridge structure, comprising:
first and second lateral portions each extending from first and second rims, wherein a substantially square opening and an elongate opening are formed in an inward progression in the first and second lateral portions, wherein a contact surface is defined between the square opening and the elongate opening, wherein the elongate opening is defined by an inner wall, an outer wall and side walls;
first and second connectors each having a circular hook, an inner surface, a mid surface, a hook start between the inner and mid surfaces, an outer protrusion start, a recessed surface between the mid surface and the outer protrusion start, wherein the circular hook extends from the hook start, wherein a substantially square protrusion extends from the outer protrusion start, wherein a support extends upward and outward in angle from the substantially square protrusion to form a right angle between the protrusion and the support, wherein a straight surface is formed parallel opposed to the inner surface, the mid surface and the recessed surface, wherein a thickness between the inner surface and the straight surface is larger than another thickness between the recessed surface and the straight surface, wherein an end wall is provided to link the inner surface and the straight surface, wherein a stopper is formed extending from an outer surface of the circular hook; and
a substantially rectangular central piece having a mid portion and first and second distal portions extending outwardly from the mid portion, wherein a hook opening is formed in the first and second distal portions;
wherein the connectors are operably assembled to the lateral portions and the central piece such that the protrusion stays in the square opening and the support stays in touch with a support surface defined between the square opening and the corresponding rim with the recessed surface receiving the contact surface, wherein the circular hook holds the central piece towards the corresponding lateral portion such that the circular hook remains substantially pushed in the hook opening, whereby the connectors with the lateral portions engaged thereto are folded inward so as for the circular hook to push in through the elongate opening till the stopper gets in touch with the mid portion to form a right angle between the central piece and the mid surface; and
wherein an upper end of the end wall of each of the first and second connectors serves to elastically slide on a lower end of the inner wall of each of the first and second lateral portions when the bridge structure is unfolded, and elastically release from the lower end of the inner wall of each of the first and second lateral portions when the bridge structure is folded.

8. The eyeglass bridge structure of claim 7, wherein the mid portion of the central piece are formed in an arc format.

9. The eyeglass bridge structure of claim 7, wherein the mid portion of the central piece are formed in an outward arc format.

10. The eyeglass bridge structure of claim 7, wherein the thickness between the inner surface and the straight surface is one fifth larger than the other thickness between the recessed surface and the straight surface.

11. The eyeglass bridge structure of claim 7, wherein the lateral portions, the connectors and the central piece are made of an identical material selected from monel, titanium and beryllium.

12. The eyeglass bridge structure of claim 7, wherein the stopper comprises a cushion step formed extending towards the central piece from the stopper and the circular hook, wherein the cushion step is formed shorter and lower than the stopper to fully fit in the hook opening of the central piece when the eyeglass bridge structure is folded.

* * * * *